United States Patent
Schroeder

(10) Patent No.: US 7,771,551 B2
(45) Date of Patent: Aug. 10, 2010

(54) ADAPTIVE CONTINUOUS ACOUSTIC WELDING SYSTEM FOR INCOMPATIBLE MATERIALS

(75) Inventor: Terrence K. Schroeder, Bernardsville, NJ (US)

(73) Assignee: SWCE, Bernardsville, NJ (US)

( * ) Notice: Subject to any disclaimer, the term of this patent is extended or adjusted under 35 U.S.C. 154(b) by 622 days.

(21) Appl. No.: 11/800,142

(22) Filed: May 3, 2007

(65) Prior Publication Data
US 2007/0257086 A1      Nov. 8, 2007

Related U.S. Application Data

(60) Provisional application No. 60/797,446, filed on May 3, 2006, provisional application No. 60/809,740, filed on May 31, 2006.

(51) Int. Cl.
*B32B 37/00*      (2006.01)
(52) U.S. Cl. ............... 156/64; 156/73.1; 156/73.4; 156/351; 156/358; 156/359; 156/363; 156/580.1
(58) Field of Classification Search .......... 156/64, 156/73.1, 73.4, 153, 350, 351, 358, 359, 156/363, 378, 379, 580.1, 580.2; 700/299, 700/300, 301
See application file for complete search history.

(56) References Cited

U.S. PATENT DOCUMENTS 5,846,377 A * 12/1998 Frantz et al. ............ 156/359
5,855,706 A * 1/1999 Grewell ................... 156/64
6,375,770 B1    4/2002 Meltzer et al.
6,458,228 B1 * 10/2002 Yoshimoto ............... 156/64

OTHER PUBLICATIONS

"Polymers: Characteristics and Compatibility for Ultrasonic Assembly", Branson Ultrasonics Corporation, Jan. 2006, website article, www.branson-plasticsjoin.com/pdf/PW-01CharComp.pdf.

* cited by examiner

*Primary Examiner*—James Sells
(74) *Attorney, Agent, or Firm*—Porzio, Bromberg & Newman, P.C.

(57) ABSTRACT

A system and method are provided which enable the joining of two materials via ultrasonic welding, including materials normally considered incompatible in traditional ultrasonic welding techniques. The system permits ultrasonic welding of a first material to a second material, the second material including material types normally considered incompatible with the first material and includes an abrader for altering the surface of the material/s to be joined. A first pressure device is operative to vary the position of the abrader and thereby vary the abrasion applied to the materials. An ultrasonic source provides acoustic energy to a weld interface between the materials. A second pressure device is operative to vary the force applied to the interface between the materials while a sensor senses the weld interface temperature. A controller dynamically adjusts the acoustic energy of the ultrasonic source, the second pressure device, and at least one of the first pressure device and a temperature varying device during junction formation. The temperature varying device is operative to modify the temperature of the material/s being welded before abrasion and/or proximate the weld interface location. In this manner, the system enables a smooth, continuous junction to form at a predetermined rate.

20 Claims, 7 Drawing Sheets

ADAPTIVE CONTINUOUS ACOUSTIC WELDING SYSTEM FOR INCOMPATIBLE MATERIALS

REFERENCE TO RELATED APPLICATIONS

This application is a non-provisional of U.S. Patent Application No. 60/797,446 filed May 3, 2007, and U.S. Patent Application No. 60/809,740 filed May 31, 2006 the entirety of each of which is hereby incorporated by reference into this application.

FIELD OF INVENTION

The present invention relates to methods and apparatuses for ultrasonically welding materials together, and more particularly to ultrasonic welding methods and apparatuses that enable the ultrasonic welding of traditionally incompatible materials.

BACKGROUND OF THE INVENTION

Ultrasonic welding first appeared in the early 1990s and continues to rapidly develop. In the infancy of ultrasonic welding, only hard plastics could be welded because only hard plastics had the properties prerequisite for the ultrasonic welding process—such hard plastics materials were acoustically conductive and had a low melting point. Less rigid plastics such as semicrystalline plastics can be welded today.

In order to weld materials together using conventional processes, the materials to be welded must be in compatible groups. Incompatible groups can not utilize the technique of ultrasonic welding. Examples of incompatible groups of materials that can not be ultrasonically welded using conventional processes include but are not limited to polycarbonates with PVC, acrylics with PVC, and usually, crystalline/semi-crystalline materials with amorphous materials.

In order to bond materials from incompatible groups it is necessary to use adhesives, solvents, as well as, mechanical means including sewing or stitching, riveting and stapling. However, none of these techniques create a union between the actual materials being bonded and thus present limitations including weakness and porosity in addition to detrimental environmental issues.

Therefore, there is a need for a system and method for ultrasonic welding of traditional incompatible materials.

SUMMARY OF THE INVENTION

A system and method are provided which enable the joining of two materials via ultrasonic welding, including materials normally considered incompatible in traditional ultrasonic welding techniques. The system permits ultrasonic welding of a first material to a second material, the second material including material types normally considered incompatible with the first material and includes an abrader for altering the surface of the material/s to be joined. A first pressure device is operative to vary the position of the abrader and thereby vary the abrasion applied to the materials. An ultrasonic source provides acoustic energy to a weld interface between the materials. A second pressure device is operative to vary the force applied to the interface between the materials while a sensor senses the weld interface temperature. A controller dynamically adjusts the acoustic energy of the ultrasonic source, the second pressure device, and at least one of the first pressure device and a temperature varying device during junction formation. The temperature varying device is operative to modify the temperature of the material/s being welded before abrasion and/or proximate the weld interface location. In this manner, the system enables a smooth, continuous junction to form at a predetermined rate.

The ultrasonic source may apply ultrasonic energy perpendicular, parallel or torsionally to the interface. The system also applies a pressure within a predetermined range perpendicular to the weld interface and the acoustic source and temperature varying device are controlled to maintain a temperature of the material/s and/or pressure of the weld interface within predetermined range. A temperature varying device may be located proximate a weld interface and/or proximate an interface between the abrader and the material/s.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Figure 1:
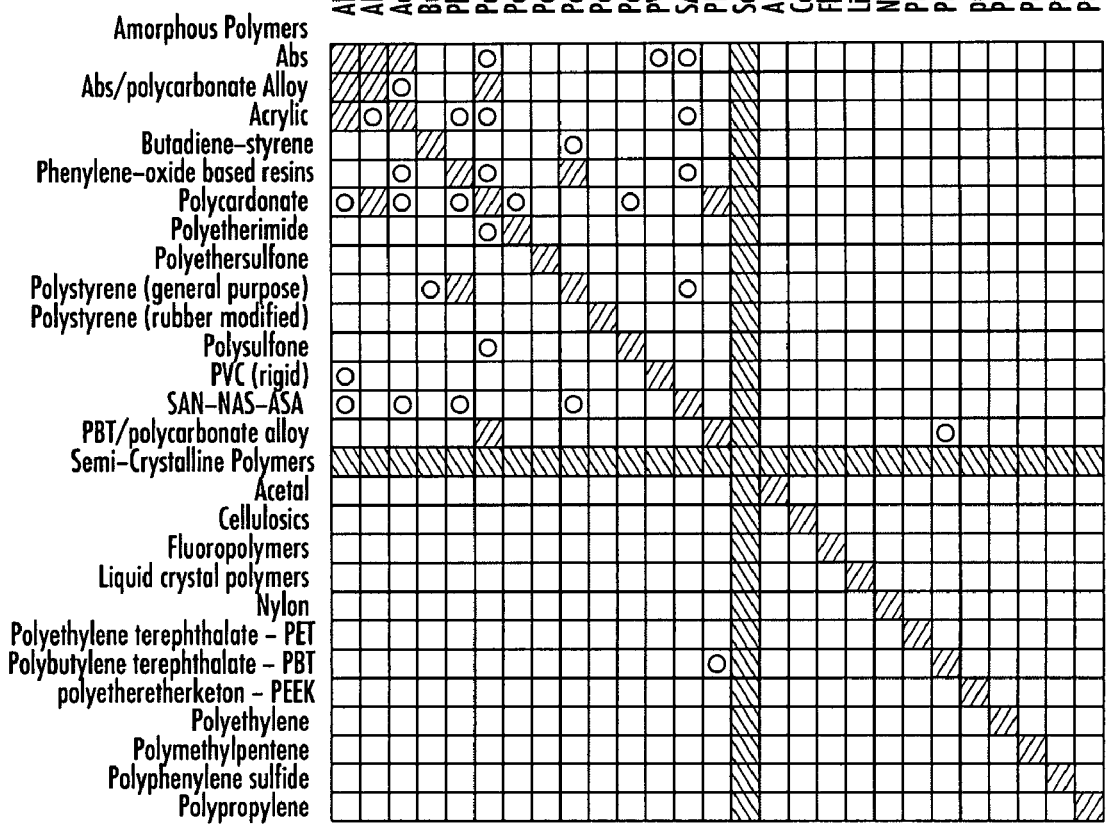
FIG. 1 is a graphical representation of the compatibility of various thermal plastics using traditional ultrasonic welding techniques.

A system and method according to the invention enables the welding of materials normally considered incompatible in traditional ultrasonic welding techniques. Referring to FIG. 1, there is shown graphical representation of compatibility of various thermal plastics when subject to conventional ultrasonic welding methods. Traditional ultrasonic welding techniques require that the materials to be welded exist in compatible groups. Materials from incompatible groups are not able to utilize the classical technique of ultrasonic welding.

Compatibility is defined as and materials are compatible if they allow for complete mixing of the materials resulting in a homogeneous bond being formed. Weldability of thermoplastics is affected by a number of factors including but not limited to polymer structure, melt temperature, melt index or flow, modulus of elasticity or stiffness and chemical make up. A more detailed description of these factors is know to those skilled in the art of the invention and provided in the publication Polymers: Characteristics and Compatibility for Ultrasonic Assembly by Branson Ultrasonics Corporation, which is incorporated by reference herein as if fully set out.

Compatibility using conventional ultrasonic welding methods for various thermal plastics is shown in FIG. 1. A solid box indicates that the materials are compatible. As the graph indicates on the diagonal, materials of the same type are compatible. For example, a first material of ABS can be ultrasonically welded to a second material of ABS. Also crystalline/semi-crystalline materials are compatible with amorphous materials. In other limited instances, a first material may be compatible with a second material or compatible with the blended second material (denotes by a circle) depending on the factors above (polymer structure, melt temperature, melt index or flow, modulus of elasticity or stiffness and chemical make up). For other combinations of materials, ultrasonic welding of the materials is not possible with conventional systems. Incompatible groups of materials include but are not limited to polycarbonates with PVC, acrylics with PVC,—usually crystalline/semi-crystalline materials with amorphous materials.

While the system for ultrasonic welding of materials normally considered incompatible in traditional ultrasonic welding techniques is particularly well suited for that application and is so described herein, it is equally well suited for use with non-metallic materials that have limited compatibility or are difficult to weld under certain circumstance/s. The system for ultrasonic welding of materials normally considered incompatible is equally well utilized on materials of limited compatibility to provide a more complete stronger weld and for materials that are compatible but may be difficult to weld. The various factor/s affecting weldability can be compensated for in order to optimize the process, such as speed of weld, strength of weld, etc.

Ultrasonic welding has long been used to join together two compatible thermoplastic pieces. Ultrasonic welding is an industrial technique whereby high-frequency ultrasonic acoustic vibrations are used to weld together objects, usually plastics, and especially for joining dissimilar compatible materials. This type of welding is used to build assemblies that are too small, too complex, or too delicate for more common welding techniques. With ultrasonic welding, there are no connective bolts, nails, soldering materials, or adhesives necessary to bind the materials together.

Figure 2:
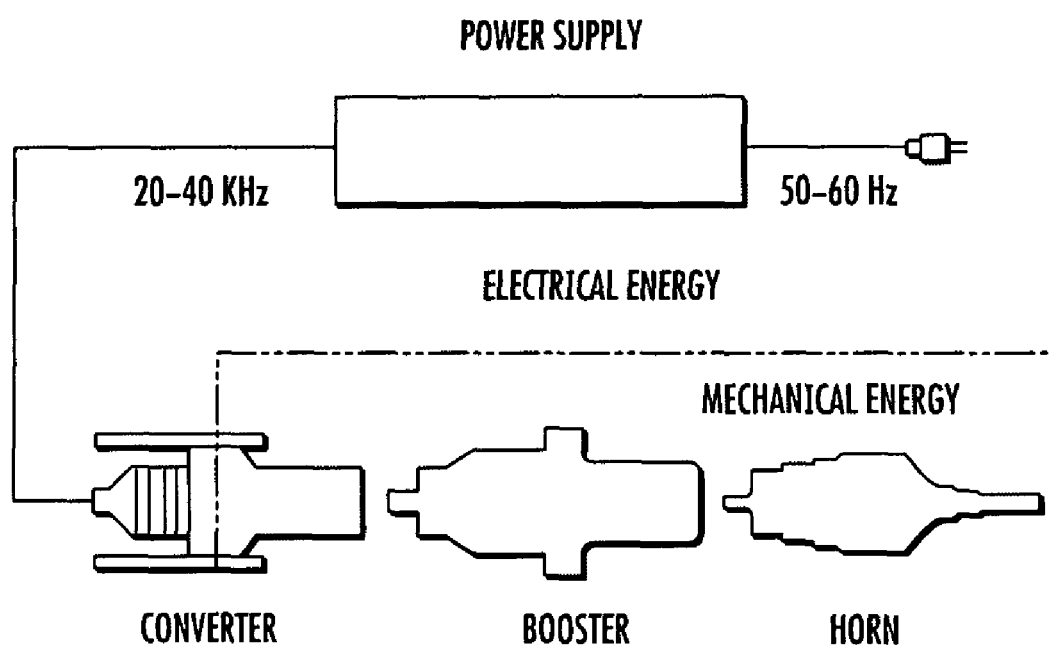
FIG. 2 is a stylized diagram of an ultrasonic generating system.
Figure 3:
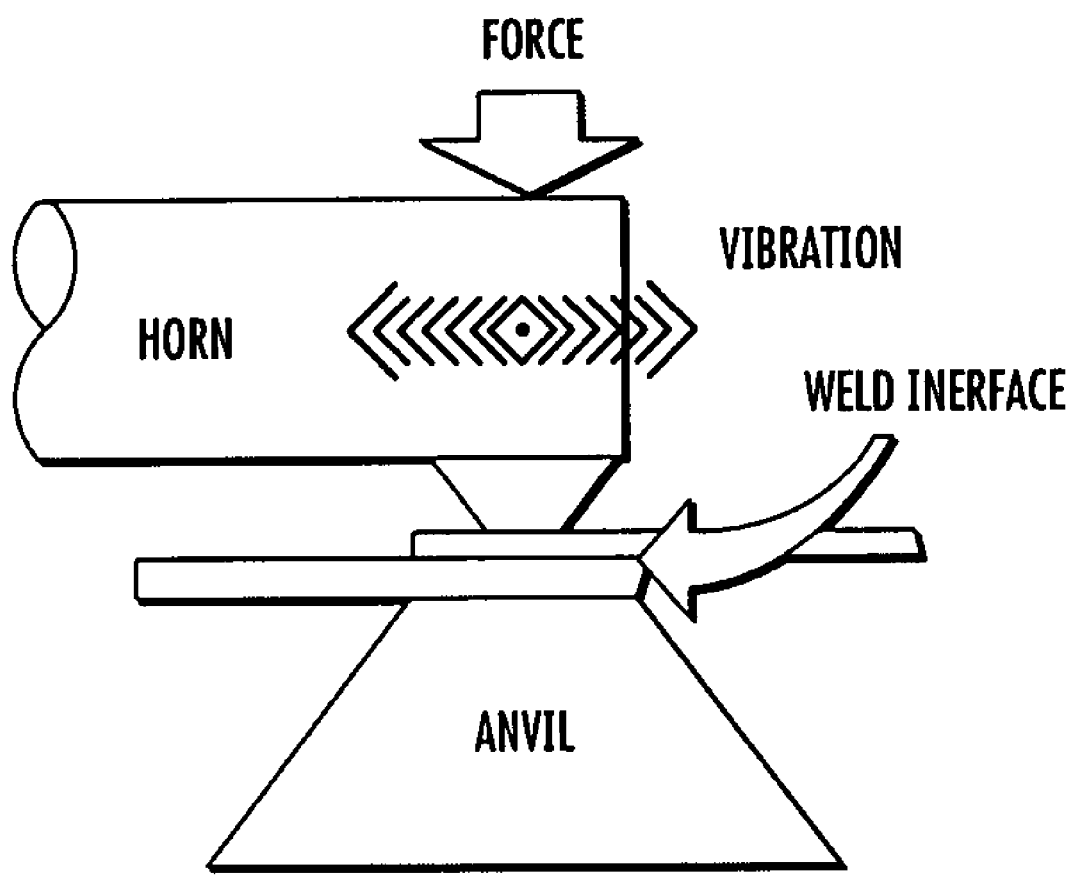
FIG. 3 is a stylized diagram of a classical ultrasonic welding system.

FIG. 2 shows a stylized diagram of an ultrasonic generating system. FIG. 3 shows a stylized diagram of a classical ultrasonic welding system. Referring to those figures, the ultrasonic welding equipment can be easily customized to fit the exact specifications of the parts being welded to provide a system for joining complex injection molded parts. The parts are sandwiched between a fixed shaped nest (anvil) and a sonotrode (horn) connected to a transducer. The horn is lowered down over the part to be joined and a ~20,000 to ~40,000 KHz low-amplitude acoustic vibration is emitted. The interface of the two parts is specially designed to concentrate the melting process. One of the parts usually has traditionally a spiked energy director which contacts the second plastic part. The directed ultrasonic energy melts the point contact between the parts, creating a joint or weld. Ultrasonic welding, as described, is a good automated alternative to glue, screws or snap-fit designs.

Ultrasonic welding of plastics causes local melting of the plastic due to absorption of vibration energy. Vibrations are introduced across the joint to be welded. Ultrasonic welding of metals is not due to heating, but instead occurs due to high-pressure dispersion of surface oxides and local motion of the materials. Although there is heating of the materials of the parts, such heating is not enough to melt the base materials. Vibrations are introduced along the interface between the parts, along the joint being welded.

Ultrasonic energy is mechanical, vibratory energy in the form of sound that operates at frequencies beyond audible sound (18,000 cycles per second and greater). Ultrasonic metal welding joins parts by applying this energy (in shear) onto the interface area between components. Standard 50/60 cycle electrical energy is transformed, by a power supply, into 20,000 (20 kHz) or 40,000 (40 kHz) cycles per second high frequency electrical energy.

This high frequency electrical energy, delivered to a piezoelectric crystal, is converted to high frequency ultrasonic mechanical energy. This mechanical vibration is transferred to a welding tip through a tapered, acoustically tuned, metal tool called a horn.

One component is held stationary while the other is 'scrubbed' against it at a frequency in the range of approximately 20,000 (20 kHz) to approximately 40,000 (40 kHz) cycles per second. This high frequency vibration, coupled with force, disperses surface films and oxides creating a clean controlled diffusion weld.

According to the invention, traditionally incompatible materials may be joined through control of surface area, temperature, external force, pressure, and level of acoustic energy such that limitless heat is not generated during the welding process that would serve to melt one of the incompatible materials being welded. As a result of this control, a system according to the invention is able to operate at a optimum bond temperature, while reducing distortion of material being welded and increasing the linear speed of the weld.

The device according to the invention enables the ultrasonic welding of traditionally incompatible materials by:

1. Modifying the surface area of the two materials to be joined depending on abrader geometry, material temperature and abrasion pressure;

1. Sensing the temperature of the forming junction (i.e., weld interface);

2. Measuring the external force (pressure) being applied to the junction during formation;

3. Sensing the level of acoustic energy applied to the junction during formation;

4. Cooling or heating both the weld head and/or the weld base;

5. Using the above measurements to vary those same parameters dynamically during the junction formation to enable a smooth, continuous junction to form at predetermined rates (linear feed of material).

Figure 4A:
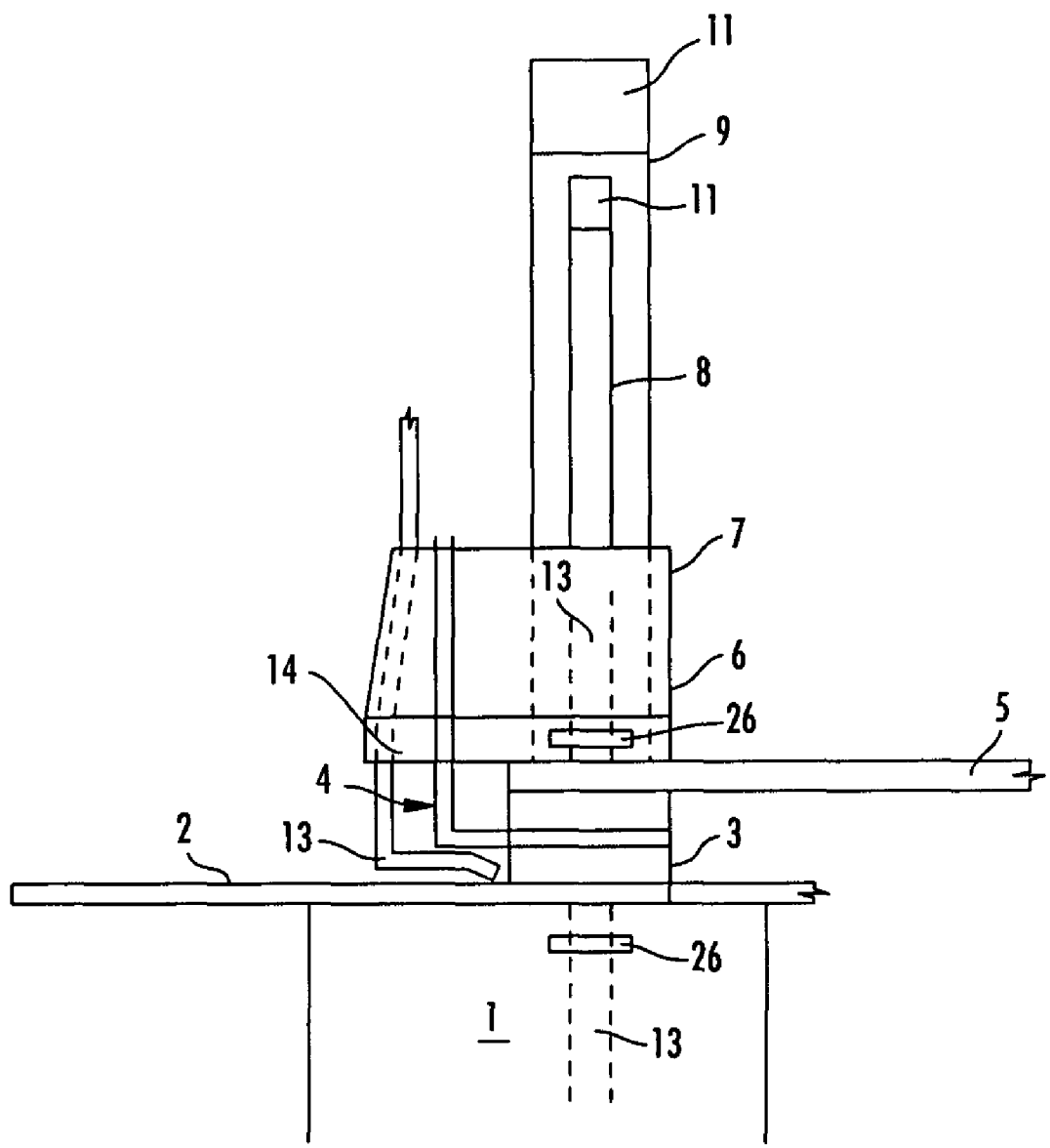
FIGS. 4a and 4b are side view illustrations of an embodiment of an ultrasonic welding system according to the invention in vertical vibration mode.
Figure 4B:
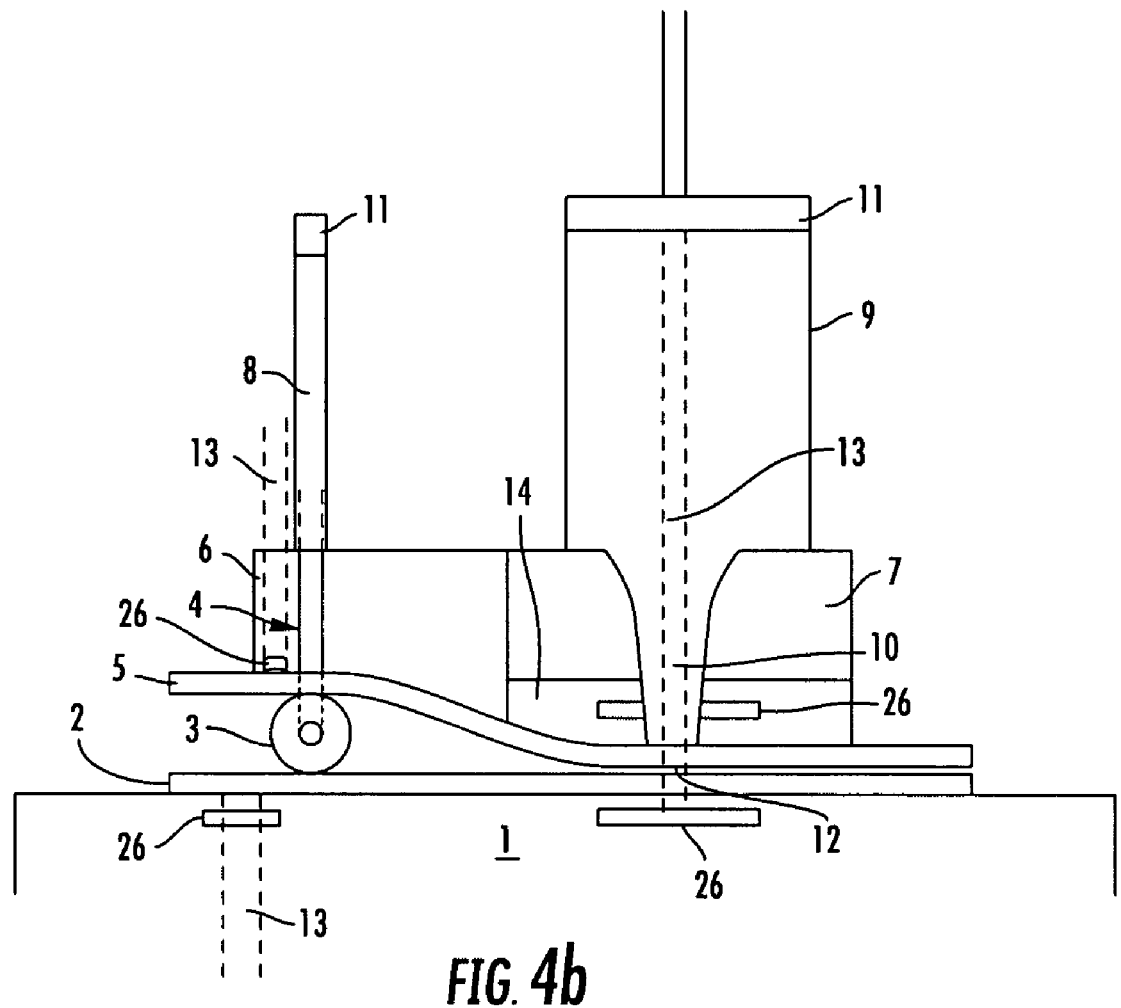

FIGS. 4a and 4b are side view illustrations of an embodiment of an ultrasonic welding system according to the invention in vertical vibration mode. With reference to those figures, the control provided by the system of the invention is accomplished in part by abrading the surfaces of the non-metallic weld materials 2, 5 to be joined (overlap weld) with a rotating abrasion disc or drum applied at a controllable pressure and temperature (as an integral part of the acoustic energy welding head) immediately ahead of the die section 7 that is used to deliver the acoustic energy used in the weld junction formation.

The amount of surface area increase of the weld materials 2, 5 is controlled by the pressure applied during the abrasion process, the temperature of the material at or immediately prior to abrasion, as well as by changing abrasion disc or drum 3 surface characteristics.

Measurement of the these values is by interrogation of the hardware used to develop and deliver the acoustic energy and by temperature sensing with IR Sensors 13 of the materials temperature at the pre-abrasion/abrasion process stage and weld junction temperature during formation 12. These measurements are then collected, integrated and used to adjust the weld parameters as required by processing with a real-time (closed loop) control system (not shown).

The system and method according to the invention thus enables virtual "sewing machine" modes of operation for the continuous joining of film/thin sheet materials to a dissimilar thicker material. The welding applications include but are not limited to the gas tight welding of acrylic and polycarbonate panels to PVC zipper flanges utilized in removable enclosure manufacture in the marine industry.

Additional application of this device is in the construction of gas tight enclosures for equipment, replacement of sewn joint requirements (sails, tarpaulins) and windows/ports in tents, emergency field hospital structures. The present invention uniquely provides the ability to join materials that have curved (2-d) geometries, since the materials being joined may be dynamically oriented by an operator to pass under the welding head.

FIGS. 4a and 4b are side view illustrations of an embodiment of an ultrasonic welding system according to the invention in vertical vibration mode. In those figures, the first component of weld material 2 is fed across a base 1, and is subject to a rotating abrasion drum or disk 3 having a drive spindle mechanism 4 for the abrasion drum or disk which incorporates 90 degree knuckles/u-joints. A second component of weld material 5 is also fed into the system. A first die section 6 positions the abrasion mechanism and a second die section 7 positions the acoustic energy aperture. A first pressure bar 8 is used for modifying/altering the positioning the first die section 6 and a second pressure bar 9 is used for modifying/altering the positioning the second die section 7 and transmitting acoustic energy to the aperture and aperture contact plate 14. The pressure bar is an exemplary pressure device which is adjustable operative to exert a force on a surface such as a pneumatic, hydrologic, or electromagnetic cylinder. An acoustic resonance cavity and aperture 10 and the aperture contact plate 14 couples the acoustic energy to the first component 2 and second component 5 of weld material.

Both the acoustic weld head, second die section 7 which includes the acoustic resonance cavity, aperture 10, with aperture plate 14 and the base 1, have Peltier cooling and heating components 26. Likewise, the first die section 6 and the area of base 1 located beneath and forward of the rotating abrasion drum or disk 3 have Peltier cooling and heating components 26. A force transducer 11 can be seen. The weld junction formation 12 occurs at the interface between the first component of weld material 2 and the second component of weld material 5 when acoustic energy is directed at the interface. IR sensors 13 monitor the materials temperature at the pre-abrasion/abrasion process stage and weld junction temperature during formation of the weld junction 12.

Figure 5A:
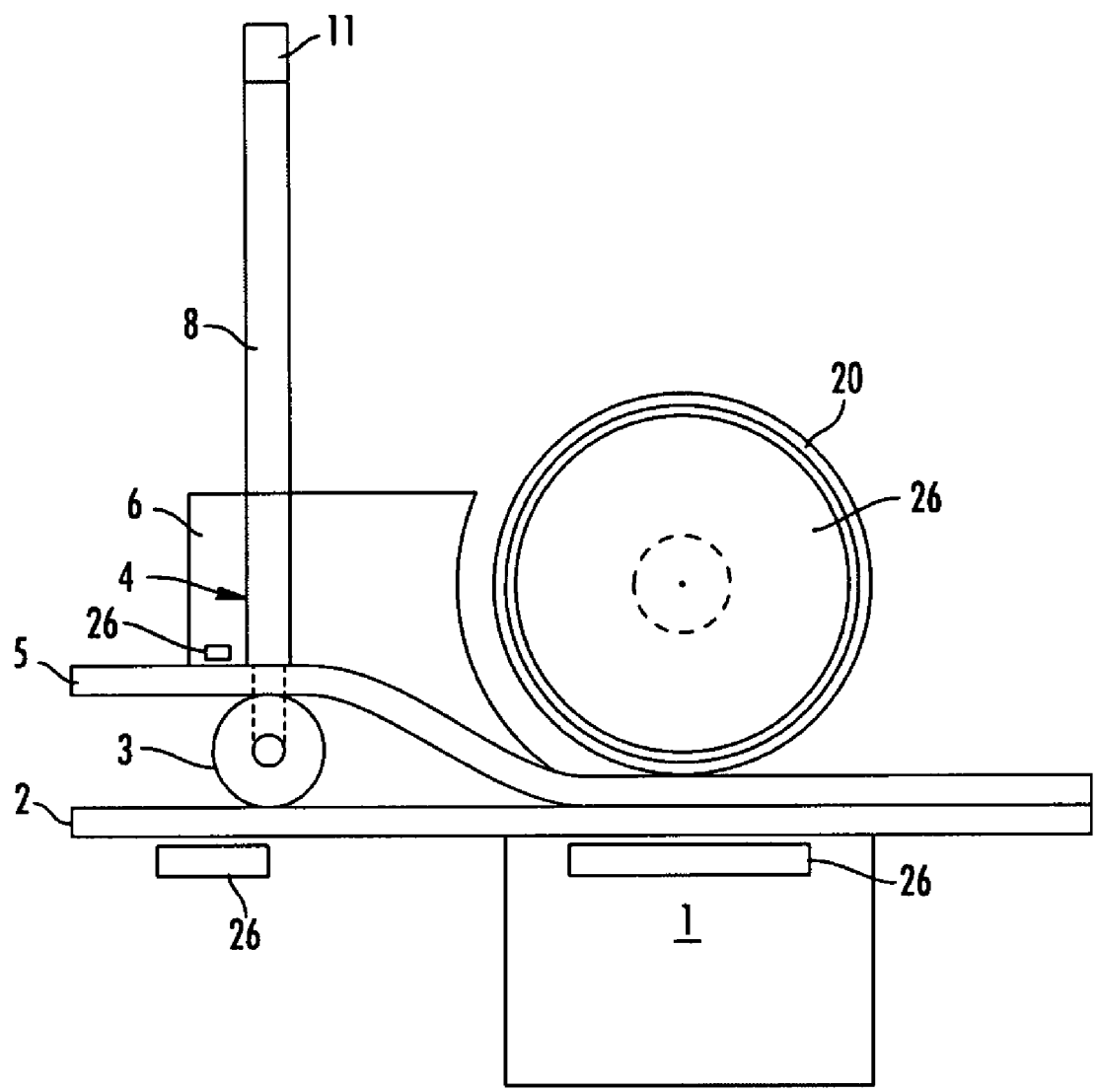
FIGS. 5a and 5b are side view illustrations an embodiment of an ultrasonic welding system according to the invention in horizontal vibration mode.
Figures 5B, 5C:
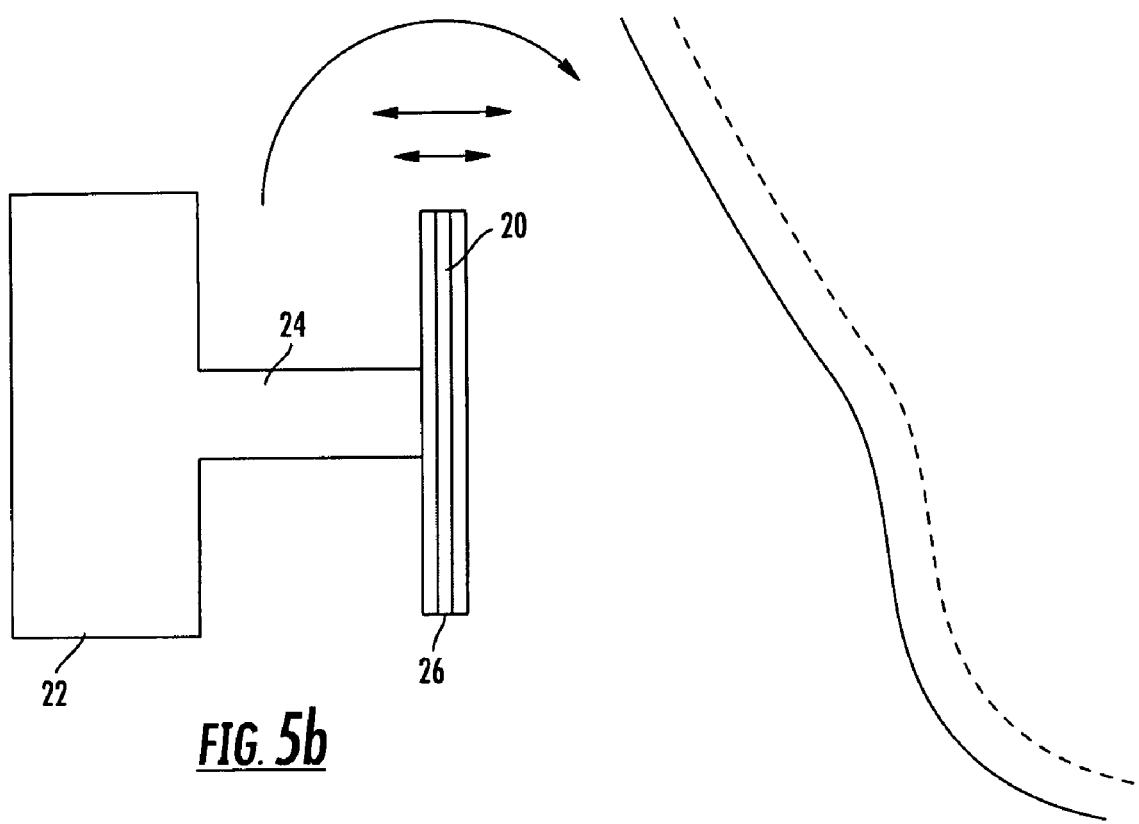
FIG. 5c is an illustration of a continuous variable weld path that can be created easily following a non-straight line or pattern using a system according to the invention.

FIGS. 5a and 5b are side view illustrations an embodiment of an ultrasonic welding system according to the invention in horizontal vibration mode. Referring to the figures illustrating that embodiment, again are illustrated a base 1, a first component of weld material 2, a rotating abrasion drum or disk 3, and a drive spindle mechanism 4 for the abrasion drum or disk which incorporates 90 degree knuckles/u-joints. Second component of weld material 5 is also provided to the system and may be abraded by the rotating abrasion drum. A first die section 6 positions of the abrasion mechanism. A first pressure bar 8 enables variation in the positioning the first die section 6. High frequency electrical energy, delivered to a piezoelectric crystal, is converted to high frequency ultrasonic mechanical energy. This mechanical vibration is transferred to a welding tip through a tapered, acoustically tuned, metal tool called a horn. An ultrasonic transducer 22 is coupled to a sonotrode (horn) 24 which is connected to a horizontal acoustic head 20.

The horizontal acoustic weld head 20 has a cylindrical disk shape and rotates with the movement of the material while moving horizontally back and forth at high speed across the material. Both the acoustic weld head 20 and the base 1 contain Peltier cooling and heating components 26. A second set of Peltier cooling and heating components 26 is located in the first die section 6 and the area of base 1 located beneath and forward of the rotating abrasion drum or disk 3. The force of the horizontal acoustic weld head 20 that is applied to the first component 2 and second component 5 of weld material on the base 1 is a function which is controlled by an adaptive algorithm. Additionally, the speed of the weld material relative to the base 1 is also controlled by the adaptive algorithm. The materials temperature at the pre-abrasion/abrasion process stage and weld junction temperature during formation 12 are monitored by IR sensors 13 and may be controlled or limited in range by the adaptive algorithm. The acoustic weld head 20 couples the acoustic energy to the first component 2 and second component 5 of weld material resulting in the formation of a weld junction between the first component 2 and second component 5 of weld material. The acoustic weld head 20 contains a means (26) to cool and/or heat the material it is in contact with, as does the base 1. This means (26), for example a Peltier cooler or heating coil, is also utilized to cool/heat the materials to be joined in the pre-weld abrasion stage of the continuous weld process.

This ability to cool/heat the material(s) being joined extends the range of amplitude-force combinations possible. This in turn, lessens material geometry distortion, increases the linear speed of the weld junction formation travel achievable, and in conjunction with variable surface area management, allows for greater mechanical weld strength for thin on thin and thin on thick web or film bond geometries.

Independent control of the first component 2 and second component 5 Pre-Weld Surface Preparation/Abrasion temperature profiles as well as acoustic weld head 20 and base 1 temperature profiles enables the following modes of operation:

| Process Stage One - Pre-Weld Surface Preparation/Abrasion | |
| --- | --- |
| First Component 2 Heated | Second Component 5 Heated |
| First Component 2 Heated | Second Component 5 Cooled |
| First Component 2 Cooled | Second Component 5 Heated |
| First Component 2 Cooled | Second Component 5 Cooled |
| Process Stage Two - Acoustic Weld | |
| Weld Head 20 Heating | Base 1 Heating |
| Weld Head 20 Heating | Base 1 Cooling |
| Weld Head 20 Cooling | Base 1 Heating |
| Weld Head 20 Cooling | Base 1 Cooling | thus providing the ability to select the optimum mix for the materials selected within a wide range of applications. Likewise, pressure profile can be controlled in the same manner.

While base 1 is shown as a flat fixed surface in a further embodiment it may be replaced by a rolling drum having a tangential surface speed equal to that of the horizontal acoustic weld head 20. Additionally, the tangential surface speeds may be varied wherein the tangential surface speed of the horizontal acoustic weld head 20 is greater than, less than or even opposite to that of the rolling drum base. Referring to FIG. 5c, there is shown a drawing of a continuous variable weld path that can be created easily following a non-straight line or pattern. In yet a further embodiment according to the invention, the rolling drum may be replaced by a second horizontal acoustic weld head which is independently controllable.

The adaptive algorithm in horizontal mode enables control of the power and frequency transmitted to the acoustic weld head, the pressure or force of the horizontal acoustic weld head that is applied perpendicular to the first component 2 and second component 5 of weld material, the displacement of the horizontal acoustic weld head across the material, the speed of material travel, the speed of the rotation of the horizontal acoustic weld head, the temperatures of the weld materials, all of which are monitored and may be controlled or limited in range, as well as the amount and type of abrasion that is applied.

The adaptive algorithm is analogous to an automatic camera which takes into consideration lighting, focus, speed, type of film, etc. and enables a fully automatic setting as well as aperture or shutter speed priority for a particular type of film optimizing the resulting image. In the system and method according to the invention, factors such as material selections as well as types of weld results and operating speed are functions for the adaptive algorithm.

In various embodiments including both the horizontal and vertical vibration mode and vertical vibration mode embodiments, the rotating abrasion drum or disk 3 can be used for abrasion of the first component of weld material 2, the second component of weld material 5 or both the first component of weld material 2 and the second component of weld material 5. Alternatively to the use of a rotating abrasion drum or disk 3, different systems and methods may be employed to provide the surface texturing of the first component of weld material 2, the second component of weld material 5 or both the first component of weld material 2 and the second component of weld material 5. Alternative techniques include but are not limited to particle abrasion such as sand blasting, high pressure air or water abrasion, mechanical knurling as well as other techniques that are known to those skilled in the art to increase surface granularity and therefore surface area. Typically, if only a single material is abraded, the material abraded is the less flexible of the materials to be welded together.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

What is claimed is:

1. A system for ultrasonic welding a first material to a second material, the second material including material types considered incompatible with the first material in ultrasonic welding techniques, the system comprising:
   an abrader for altering a surface of at least one of the first material and the second material;
   a first pressure device for varying the position of the abrader and thereby varying an amount of abrasion applied to the at least one of the first material and the second material;
   an ultrasonic source for providing acoustic energy to an interface between the first material and the second material;
   a second pressure device for varying the force applied to the interface between the first material and the second material;
   a sensor for determining an interface temperature of the interface between the first material and the second material;
   a first temperature varying device for altering the temperature of at least one of the first material and the second material; and
   a controller for dynamically adjusting the acoustic energy of the ultrasonic source, the second pressure device, and at least one of the first pressure device and the temperature varying device during junction formation at the interface to enable a smooth, continuous junction to form at a predetermined rate.

2. The system for ultrasonic welding a first material to a second material according to claim 1 wherein the ultrasonic source applies ultrasonic energy perpendicular to the interface.

3. The system for ultrasonic welding a first material to a second material according to claim 1 wherein the ultrasonic source applies ultrasonic energy horizontal or parallel to the interface.

4. The system for ultrasonic welding a first material to a second material according to claim 1 wherein the ultrasonic source torsionally to the interface.

5. The system for ultrasonic welding a first material to a second material according to claim 1 wherein the ultrasonic source applies a pressure perpendicular to the interface, said pressure being within a predetermined range.

6. The system for ultrasonic welding a first material to a second material according to claim 5 wherein the first temperature varying device is located proximate a weld and wherein the ultrasonic source and the first temperature varying device are controlled to maintain a temperature of at least one of the first material and the second material, said temperature being within a predetermined range.

7. The system for ultrasonic welding a first material to a second material according to claim 5 wherein the first temperature varying device is located proximate a weld interface and wherein the ultrasonic source and the first temperature varying device are controlled to maintain a pressure of the weld interface, said pressure being within a predetermined range.

8. The system for ultrasonic welding a first material to a second material according to claim 5 wherein the first temperature varying device is located proximate a weld interface or proximate an interface between the abrader and at least one of the first material and the second material.

9. A system for ultrasonic welding materials considered incompatible in ultrasonic welding techniques, the system comprising:
   an ultrasonic source;
   means for material abrasion of at least one of the materials;
   means for continuous control of amount of material abrasion applied to the material;
   means for force sensing the force applied to a weld interface between the materials;
   means for continuous control of amount of force applied to the weld interface;
   means for temperature sensing a temperature at the weld interface; and
   means for continuous control of the temperature of at least one of the materials;
   whereby the two materials normally considered incompatible may be joining by ultrasonic welding.

10. The system for ultrasonic welding of materials normally considered incompatible in traditional ultrasonic welding techniques as recited in claim 9 wherein the ultrasonic source applies ultrasonic energy perpendicular to the materials.

11. The system for ultrasonic welding of materials normally considered incompatible in traditional ultrasonic welding techniques as recited in claim 9 wherein the ultrasonic source applies acoustic energy horizontal or parallel to the materials.

12. The system for ultrasonic welding of materials normally considered incompatible in traditional ultrasonic welding techniques as recited in claim 9 wherein the ultrasonic source applies acoustic energy torsionally to the materials.

13. The system for ultrasonic welding of materials normally considered incompatible in traditional ultrasonic welding techniques as recited in claim 9 wherein the ultrasonic source applies a load perpendicular to the materials, a pressure applied to the weld interface being within a predetermined range.

14. The system for ultrasonic welding of materials normally considered incompatible in traditional ultrasonic welding techniques as recited in claim 9 wherein the ultrasonic source maintains a temperature within at least one of the materials, a pressure and a temperature at the weld interface being controlled within predetermined ranges.

15. The system for ultrasonic welding of materials normally considered incompatible in traditional ultrasonic welding techniques as recited in claim 9 wherein the means for continuous control of the temperature adjusts temperature of the material proximate a weld interface and wherein the ultrasonic source and the means for continuous control of the temperature are controlled to maintain a pressure of the weld interface, said pressure being within a predetermined range.

16. The system for ultrasonic welding of materials normally considered incompatible in traditional ultrasonic welding techniques as recited in claim 9 wherein the means for continuous control of the temperature adjusts a temperature of the material proximate a weld interface or proximate an interface between the means for material abrasion and the material.

17. A method of ultrasonic welding a first material to a second material, the second material including material types considered incompatible with the first material in ultrasonic welding techniques, the method comprising:
   abrading a surface of at least one of the first material and the second material to modify the area of the surface;
   providing acoustic energy to a weld interface between the first material and the second material;
   applying a force to the weld interface;
   sensing the temperature of the weld interface;
   dynamically controlling the acoustic energy applied to the weld interface, the force applied to the weld interface, and at least one of the surface area created during the abrading of the surface or the temperature of the at least one of the first material and the second material to enable a smooth, continuous junction to form at a predetermined rate.

18. A method of ultrasonic welding a first material to a second material according to claim 17, wherein dynamically controlling includes controlling the temperature of the first material or the second material during the abrading step.

19. A method of ultrasonic welding a first material to a second material according to claim 17, wherein dynamically controlling includes controlling the temperature of the first material or the second material proximate the weld interface.

20. A method of ultrasonic welding a first material to a second material according to claim 17, wherein dynamically controlling includes controlling the pressure exerted on the first material or the second material while abrading or the pressure exerted on the weld interface.

* * * * *